(12) United States Patent
Mohammed et al.

(10) Patent No.: US 9,009,646 B1
(45) Date of Patent: Apr. 14, 2015

(54) FINDING I/O PLACEMENT WITH A ROUTER

(71) Applicant: Cypress Semiconductor Corporation, San Jose, CA (US)

(72) Inventors: Haneef Mohammed, Beaverton, OR (US); Kyle Kearney, Portland, OR (US)

(73) Assignee: Cypress Semiconductor Corporation, San Jose, CA (US)

( * ) Notice: Subject to any disclaimer, the term of this patent is extended or adjusted under 35 U.S.C. 154(b) by 10 days.

(21) Appl. No.: 13/731,865

(22) Filed: Dec. 31, 2012

Related U.S. Application Data (60) Provisional application No. 61/672,393, filed on Jul. 17, 2012.

(51) Int. Cl.
*G06F 17/50* (2006.01)

(52) U.S. Cl.
CPC .................................. *G06F 17/5077* (2013.01)

(58) Field of Classification Search
USPC .......................................................... 716/128
See application file for complete search history.

(56) References Cited

U.S. PATENT DOCUMENTS

| | | | |
|---|---|---|---|
| 5,521,837 A | 5/1996 | Frankle | |
| 5,636,129 A * | 6/1997 | Her | ................................ 716/129 |
| 5,757,658 A | 5/1998 | Rodman | |
| 5,838,583 A | 11/1998 | Varadarajan | |
| 6,086,629 A | 7/2000 | McGettigan | |
| 6,519,749 B1 | 2/2003 | Chao | |
| 7,107,563 B1 * | 9/2006 | Kong | ............................. 716/128 |
| 7,143,360 B1 | 11/2006 | Ogami | |
| 7,681,164 B2 | 3/2010 | Lin | |
| 8,051,400 B2 | 11/2011 | Frederick | |
| 8,127,263 B2 | 2/2012 | Torvi | |
| 2004/0221253 A1 | 11/2004 | Imper | |
| 2005/0076319 A1 | 4/2005 | Chow | |
| 2007/0283311 A1 | 12/2007 | Karoubalis | |
| 2008/0134122 A1 | 6/2008 | Fotakis | |
| 2012/0136633 A1 | 5/2012 | Xu | |

OTHER PUBLICATIONS

McMurchie, L and Ebeling, C., "PathFinder: a negotiation-based performance-driven router for FPGAs", 1998 University of Washington Department of Computer Science and Engineering, Seattle, WA.
Price, A., "Hephaestus: Solving the Heterogeneous, Highly Constrained Analog Placement Problem", 2012 University of Washington Department of Electrical Engineering, Seattle, WA.
Tessier, R., "Negotiated A* Routing for FPGAs", 1998 MIT Laboratory for Computer Science, Cambridge, MA.

(Continued)

*Primary Examiner* — Eric Lee (57) ABSTRACT

A method for routing a design may comprise receiving a design for implementing in a target device, wherein the design includes an input/output (I/O) signal of a functional block, and wherein the functional block is assigned to a physical component of the target device; based on the design and on a routing resource graph representing the target device, calculating a route including the physical component and a physical pin of the target device; and assigning the physical pin of the target device to the I/O signal based on the calculated route.

20 Claims, 9 Drawing Sheets

(56) References Cited

OTHER PUBLICATIONS

"Cypress Enhances PSoC Creator™ Integrated Design Environment for PSoC® 3 and PSoC 5 Architectures with New Version 2.1", The Motley Fool, Aug. 20, 2012, [retrieved on Dec. 19, 2012], Retrieved from the Internet <URL:http://www.fool.com/investing/businesswire/2012/08/20/cypress-enhances-psoc-creator-integrated-design-en.aspx>.

Lysecky, R., Vahid, F., and Tan, S., "Dynamic FPGA Routing for Just-in-Time FPGA Compilation", Jun. 7-11, 2004 University of California, Riverside, San Diego, CA.

Marolia, P. M., "Watermarking FPGA Bitstream for IP Protection", Aug. 2008 Georgia Institute of Technology, Atlanta, GA.

* cited by examiner

FINDING I/O PLACEMENT WITH A ROUTER

RELATED APPLICATIONS

This application claims priority to U.S. Provisional Application No. 61/672,393, filed on Jul. 17, 2012, which is hereby incorporated by reference.

BACKGROUND

Technical Field

This disclosure relates to the field of electronic design automation and, in particular, to placement and routing.

Field-programmable gate arrays (FPGAs) and Programmable Logic Devices (PLDs) have been used in data communication and telecommunication systems. Conventional PLDs and FPGAs consist of an array of programmable elements, with the elements programmed to implement a fixed function or equation. Some currently-available Complex PLD (CPLD) products comprise arrays of logic cells. Conventional PLD devices have several drawbacks, such as limited speed and limited data processing capabilities.

In developing complex integrated circuits, there is often a need for additional peripheral units, such as operational and instrument amplifiers, filters, timers, digital logic circuits, analog to digital and digital to analog converters, etc. As a general rule, implementation of these extra peripherals creates additional difficulties: extra space for new components, additional attention during production of a printed circuit board, and increased power consumption. All of these factors can significantly affect the price and development cycle of the project.

The introduction of the Programmable System on Chip (PSoC) features digital and analog programmable blocks, which allow the implementation of a large number of peripherals. A programmable interconnect allows analog and digital blocks to be combined to form a wide variety of functional modules. The digital blocks consist of smaller programmable blocks and are configured to provide different digital functions. The analog blocks are used for development of analog elements, such as analog filters, comparators, inverting amplifiers, as well as analog to digital and digital to analog converters.

The implementation of a design for a PSoC device may include the stages of placement, where functional blocks of the design are assigned to physical hardware resources (such as analog or digital blocks) of the PSoC chip, and routing, where a routing plan is created based on the design, for programming the programmable interconnect to establish the appropriate connections between the physical hardware resources.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In one embodiment, development of an application for a programmable device, such as a programmable system on a chip (PSoC), may be facilitated by an integrated development environment (IDE). Such an IDE may include a schematic capture tool that may allow a user to draw a schematic of a design that the user wishes to implement on the programmable device. In one embodiment, the schematic capture tool may allow the user to add to the schematic one or more functional blocks, which may in turn be associated with one or more input/output (I/O) signals.

In one embodiment, the IDE may be used to develop an application for implementing in a target programmable device such as a Programmable System-on-Chip (PSoC) or a similar device, as described in U.S. patent application Ser. No. 12/774,680 filed on May 5, 2010, and entitled "Combined Analog Architecture and Functionality in a Mixed-Signal Array", which is hereby incorporated by reference. In an alternative embodiment, the application for the target programmable device may be developed using standalone software tools.

Figure 1:
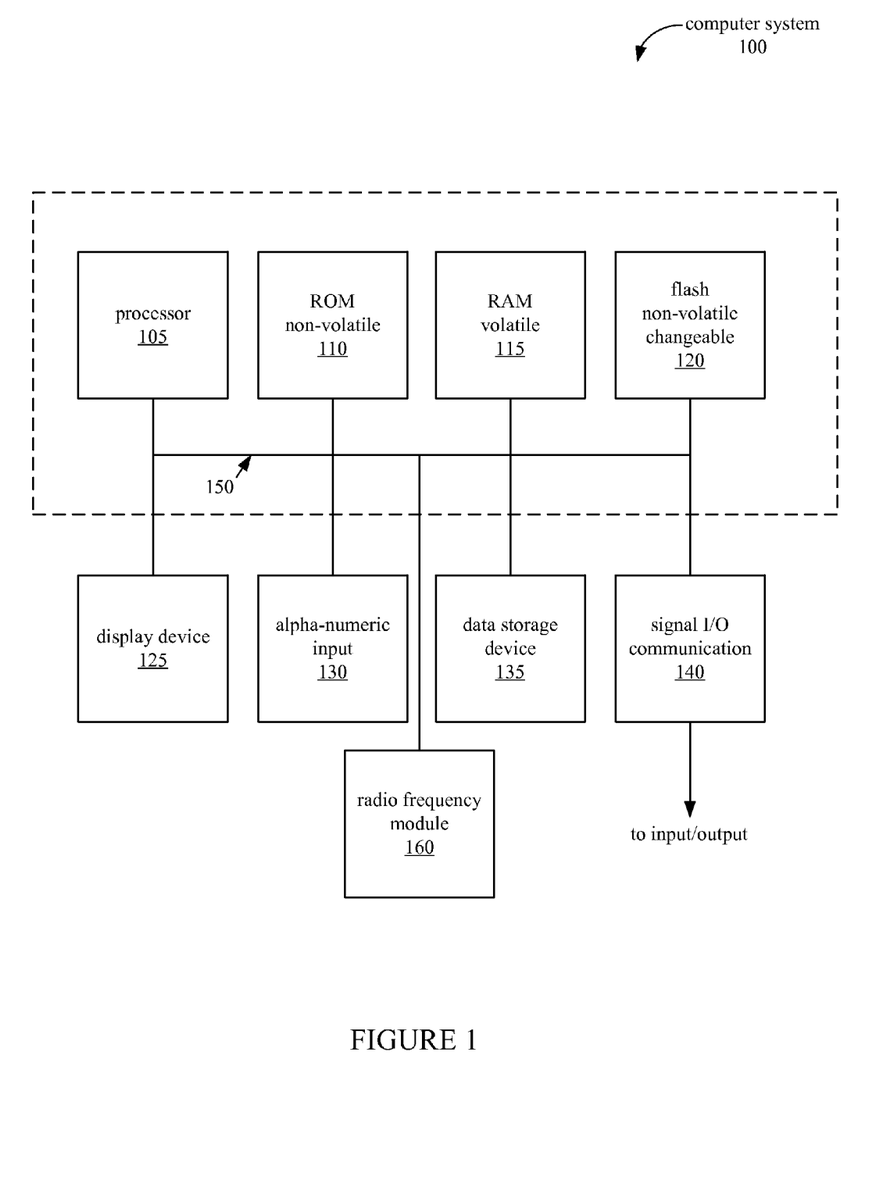
FIG. 1 is a block diagram illustrating an embodiment of a computer system.

FIG. 1 illustrates circuitry of computer system 100, which may form a platform for the implementation of an IDE or other application development tools, according to one embodiment. Computer system 100 includes an address/data bus 150 for communicating information, a central processor 105 functionally coupled with the bus for processing information and instructions, a volatile memory 115 (e.g., random access memory RAM) coupled with the bus 150 for storing information and instructions for the central processor 105 and a non-volatile memory 110 (e.g., read only memory ROM) coupled with the bus 150 for storing static information and instructions for the processor 105. Computer system 100 also optionally includes a changeable, non-volatile memory 120 (e.g., flash) for storing information and instructions for the central processor 105, which can be updated after the manufacture of system 100.

Computer system 100 also optionally includes a data storage device 135 (e.g., a rotating magnetic disk) coupled with the bus 150 for storing information and instructions.

Figure 2:
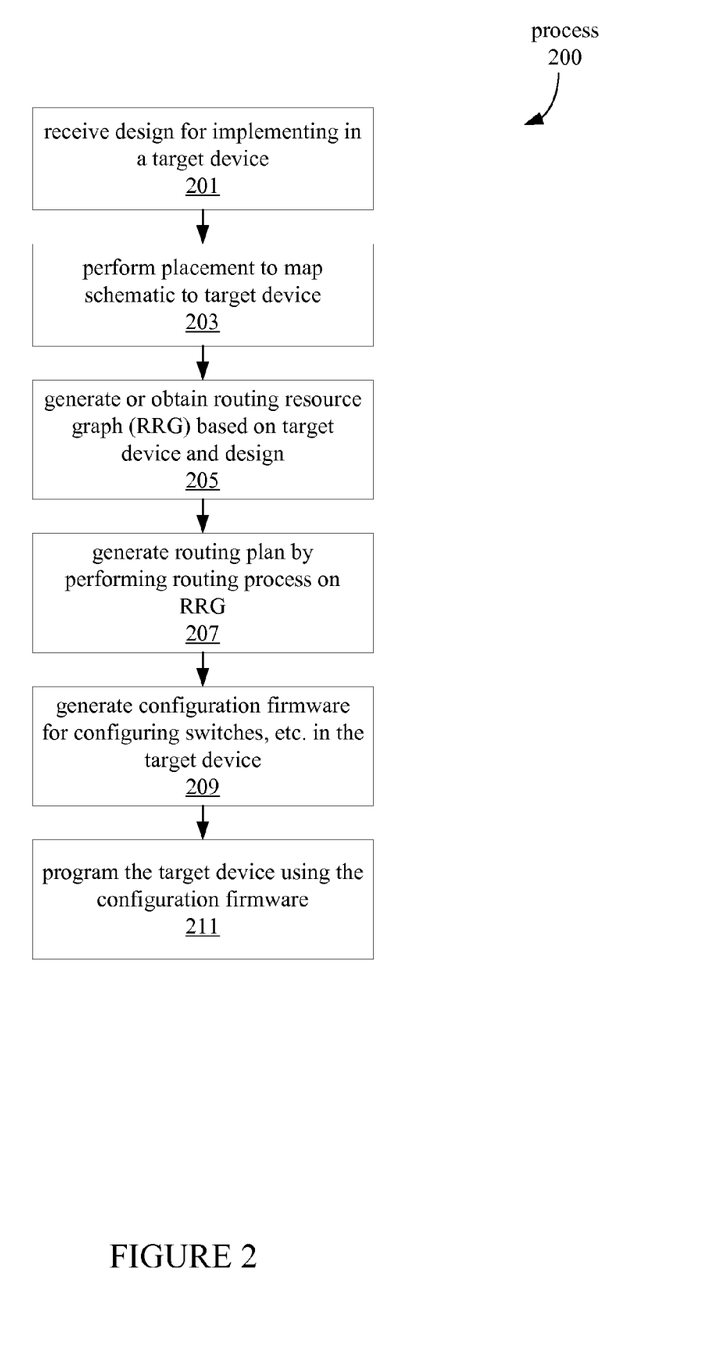
FIG. 2 is a flow diagram illustrating a process for implementing a design in a target device, according to one embodiment.

Embodiments of computer system 100 of FIG. 2 may also include alphanumeric input device 130. Device 130 can communicate information and command selections to the central processor 100. Device 130 may take the form of a touch sensitive digitizer panel or typewriter-style keyboard. Display device 125 utilized with the computer system 100 may be a liquid crystal display (LCD) device, cathode ray tube (CRT), field emission device (FED, also called flat panel CRT), light emitting diode (LED), plasma display device, electro-luminescent display, electronic paper or other display device suitable for creating graphic images and alphanumeric characters recognizable to the user. Optional signal input/output communication device 140 is also coupled to bus 150.

Computer system 100 may also include a radio frequency module 160, which may implement a variety of wireless protocols, for example IEEE 802.11 or Bluetooth.

FIG. 2 illustrates a process 200 that may be performed by a computer system, such as computer system 100, that is implementing an IDE according to one embodiment. At block 201, the IDE may receive the design to be implemented in the programmable device via a user interface, such as a graphical user interface (GUI), or may alternatively receive the design by loading the design from a file stored in memory.

In one embodiment where the process 200 is implemented in an IDE, the IDE may receive the design via inputs from a user. Such inputs may include the placement and configuration of functional blocks to form a schematic in the GUI. A user may also use the GUI to add I/O signals to or from the functional blocks in the schematic. The user may connect these I/O signals to other functional blocks, or designate them as off-chip signals to be connected to an external pin. The design as received from the user or from memory may thus describe one or more functional blocks and I/O signals associated with the one or more functional blocks.

During a placement stage 203, the IDE may then map these functional blocks in the user-designed schematic to physical hardware resources available in the programmable device. For example, the programmable device may be an integrated circuit chip having a number of digital and analog blocks that may be configured to perform different functions; thus, the IDE may assign the functional blocks specified in the schematic by the user to specific analog or digital blocks in the integrated circuit.

Completion of the placement stage results in a description of the connectivity to be achieved using the routing resources on the programmable device. During the routing stage, this connectivity may be achieved using a routing process to determine a set of routes for implementing the user's requested functionality, if such a set of routes exists. In one embodiment, the routing process may comprise a variation of the Pathfinder negotiated congestion method. In one embodiment, the routing process may be used to automatically select port and pin assignments for I/O signals in the user's design, instead of such port and pin assignments being manually selected by the user during the placement stage.

In one embodiment, the routing may be performed using a routing resource graph (RRG) representing the target programmable device. At block 205, this RRG may be generated or may be obtained from a file or library stored in memory. The RRG may include a number of nodes and edges connecting the nodes, where the nodes and edges represent physical components of the specific programmable device, including routing resources such as switches and wires. Thus, after the placement stage has assigned a functional block of the design to a physical component (such as an analog or digital block of the integrated circuit chip), the routing process at block 207 may calculate routes using the RRG, such that the routes connect I/O signals from the physical components (in which the functional blocks are implemented) with physical pins or other functional blocks.

In one embodiment, the result of the routing process is a routing plan, which indicates the routes for establishing the connectivity for implementing the user design. For example, a routing plan may indicate which physical routing resources of the target device may be used to carry particular signals from the functional blocks to other functional blocks or to physical pins or ports. In one embodiment, the routing plan may also include pin or port assignments generated by the routing process. For example, the routing plan may indicate an assignment of an I/O signal to a physical pin of the target device. These pin or port assignments may be extracted from the routing plan.

In one embodiment, the selection of pin and port assignments by using the routing process may reduce the number cases where a user would manually force pin placements in order to achieve a particular functionality. This in turn enables the user to build a design without needing to study routing diagrams and determine optimal pin placement. According to one embodiment, this approach may further allow the IDE software to more quickly adapt to different chips having different constraints, without specialized coding of special rules for chip-specific I/O constraints.

In one embodiment, the routing plan may be converted, at block 209, to firmware for configuring the programmable device. For example, in an embodiment where the programmable device is an integrated circuit chip including configurable analog and digital blocks, the configuration firmware may include instructions for closing or opening switches in a programmable interconnect to establish the appropriate connections between the analog and digital blocks, as specified by the user's design. The configuration firmware may be generated by the IDE based on the results of the routing stage, which may be a routing plan that includes the port and pin assignments.

At block 211, the target device may be programmed with the configuration firmware. In one embodiment, the programming process causes the target device to connect the physical components, such as analog and digital blocks, to each other and to physical pins according to the routes described in the routing plan.

Figure 3:
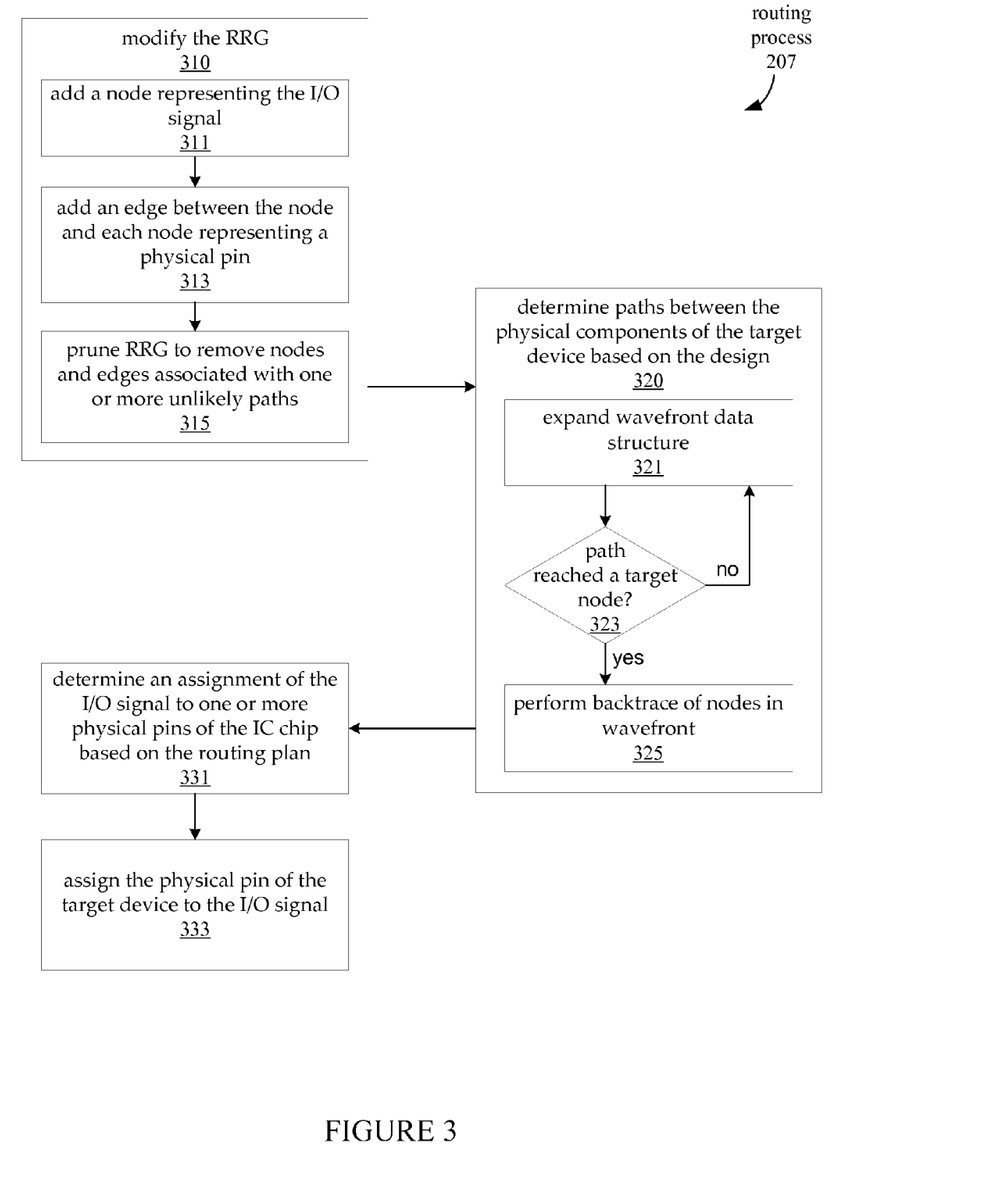
FIG. 3 is a flow diagram illustrating a routing process, according to one embodiment.

FIG. 3 is a flow diagram illustrating in more detail the routing process of block 207, according to one embodiment. In one embodiment, the routing process 207 may be performed by a computer system 100, as illustrated in FIG. 1.

At the start of process 207, the computer system 100, has obtained the user's design and a routing resource graph (RRG) for the target device in which the design will be implemented. In one embodiment, the RRG is a directed graph representing the connectivity available in the device on which the nets will be routed. In one embodiment, the RRG represents a number of physical components of the target device as a number of nodes. These nodes may each be connected to one or more other nodes by edges. In one embodiment, the RRG is constructed in accord with a Pathfinder negotiated congestion routing method; however, other routing methods may be used that are different from Pathfinder.

Figure 4:
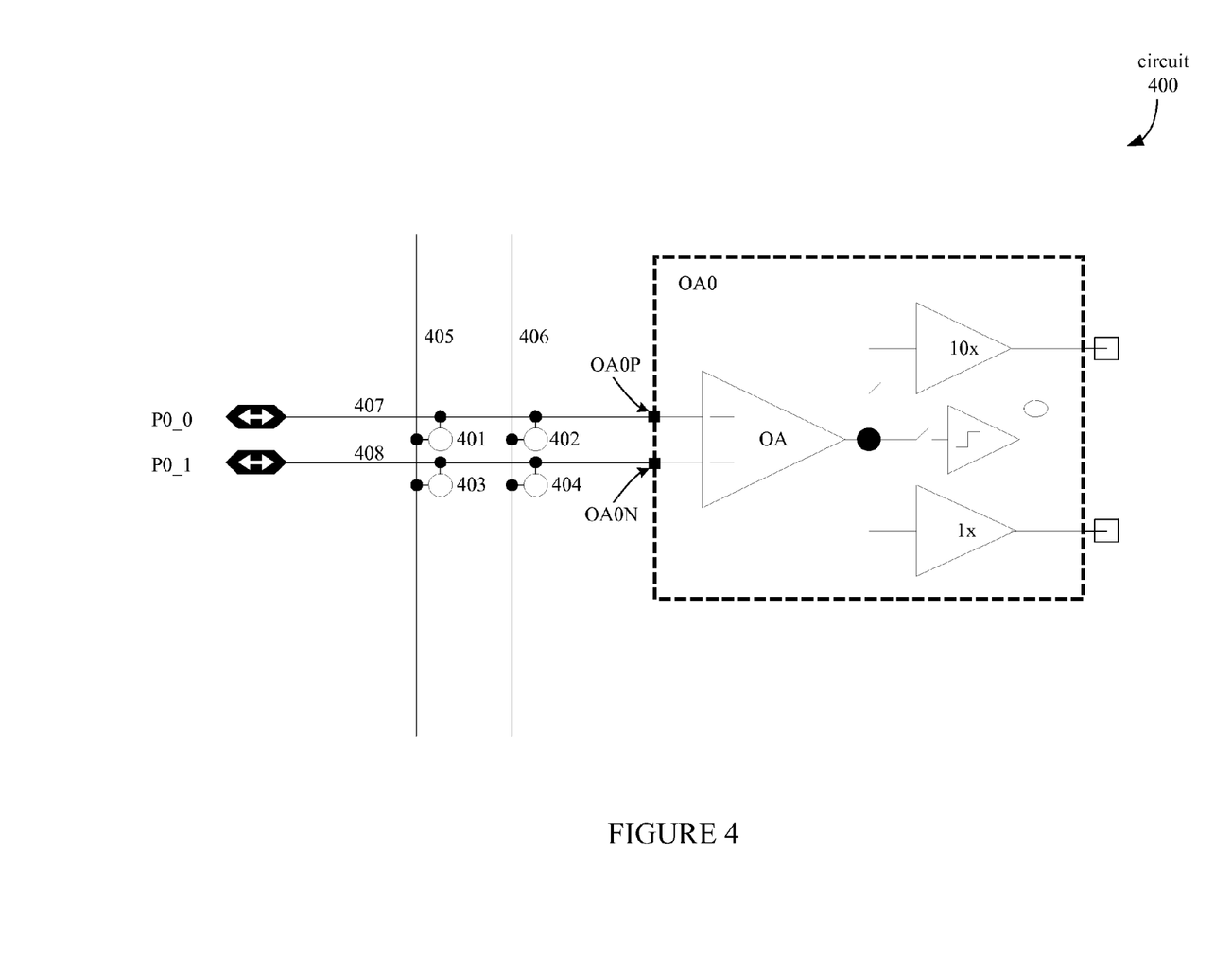
FIG. 4 illustrates a circuit in a target device, according to one embodiment.

FIG. 4 illustrates an exemplary circuit 400 which may be found in a target device. Circuit 400 includes a number of routing resources, including switches 401-404, wires 405-408, as well as other physical components. These physical components include external general purpose input/output (GPIO) pins P0__0 and P0__1 (which may be pins of a port P0). The configurable block illustrated is an operational amplifier block OA0 that includes an operational amplifier OA and positive and negative inputs OA0P and OA0N, respectively. In some embodiments, a target device may include fixed-function blocks instead of configurable blocks, or in addition to configurable blocks, which may be connected by the routing resources.

In one embodiment, a RRG may be generated by representing each wire as a node. Each pin may be represented by a node and an edge. A switch may be represented by an edge, a node, and another edge. Accordingly, the example circuit 400 may be initially represented as RRG 500, as illustrated in FIG. 5, according to an embodiment.

Figure 5:
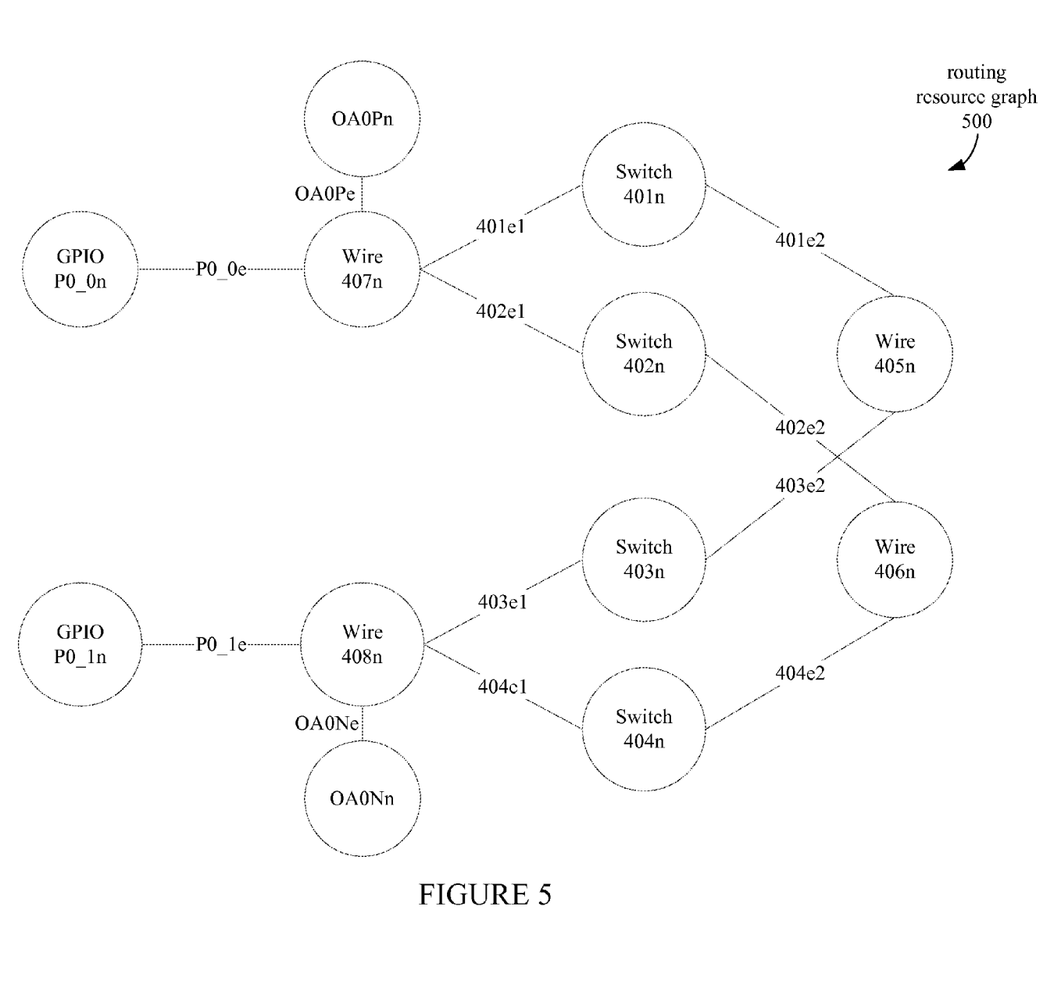
FIG. 5 illustrates an embodiment of a routing resource graph.

With reference to FIGS. 4 and 5, wires 405, 406, 407, 408 of circuit 400 are represented in RRG 500 as nodes 405$n$, 406$n$, 407$n$, 408$n$. Pin P0_0 is represented as node P0_0n and edge P0_0e. Pin P0_1 is represented as node P0_1n and edge P0_1e. Switch 401 is represented as node 401$n$ and edges 401$e$1 and 401$e$2. Switch 402 is represented as node 401$n$ and edges 402$e$1 and 402$e$2. Switch 403 is represented as node 401$n$ and edges 403$e$1 and 403$e$2. Switch 404 is represented as node 401$n$ and edges 404$e$1 and 404$e$2. Operational amplifier positive input OA0P is represented as node OA0Pn and edge OA0Pe. Operational amplifier negative input OA0N is represented as node OA0Nn and edge OA0Ne. This base RRG 500 may be stored for use with future router invocations on the same architecture.

Referring back to FIG. 3, the routing resource graph (RRG) may be modified at block 310. In one embodiment, the modifications may be performed based on the user's design or configuration settings of the IDE.

At block 311, a routing utility, or router, may add to the RRG a node representing an I/O signal. In one embodiment, the routing utility may be executed as a standalone application; alternatively, the routing utility may be invoked by an IDE to add the I/O signal node to the RRG. The added node may represent an I/O signal of a functional block in the design that the user wishes to connect to an external GPIO pin. The added node may be connected to existing nodes in the RRG that represent the external GPIO pins via an edge, as provided at block 313. In one embodiment, nodes may be added for each of the I/O signals of the design that are to be assigned to external GPIO pins.

Figure 6:
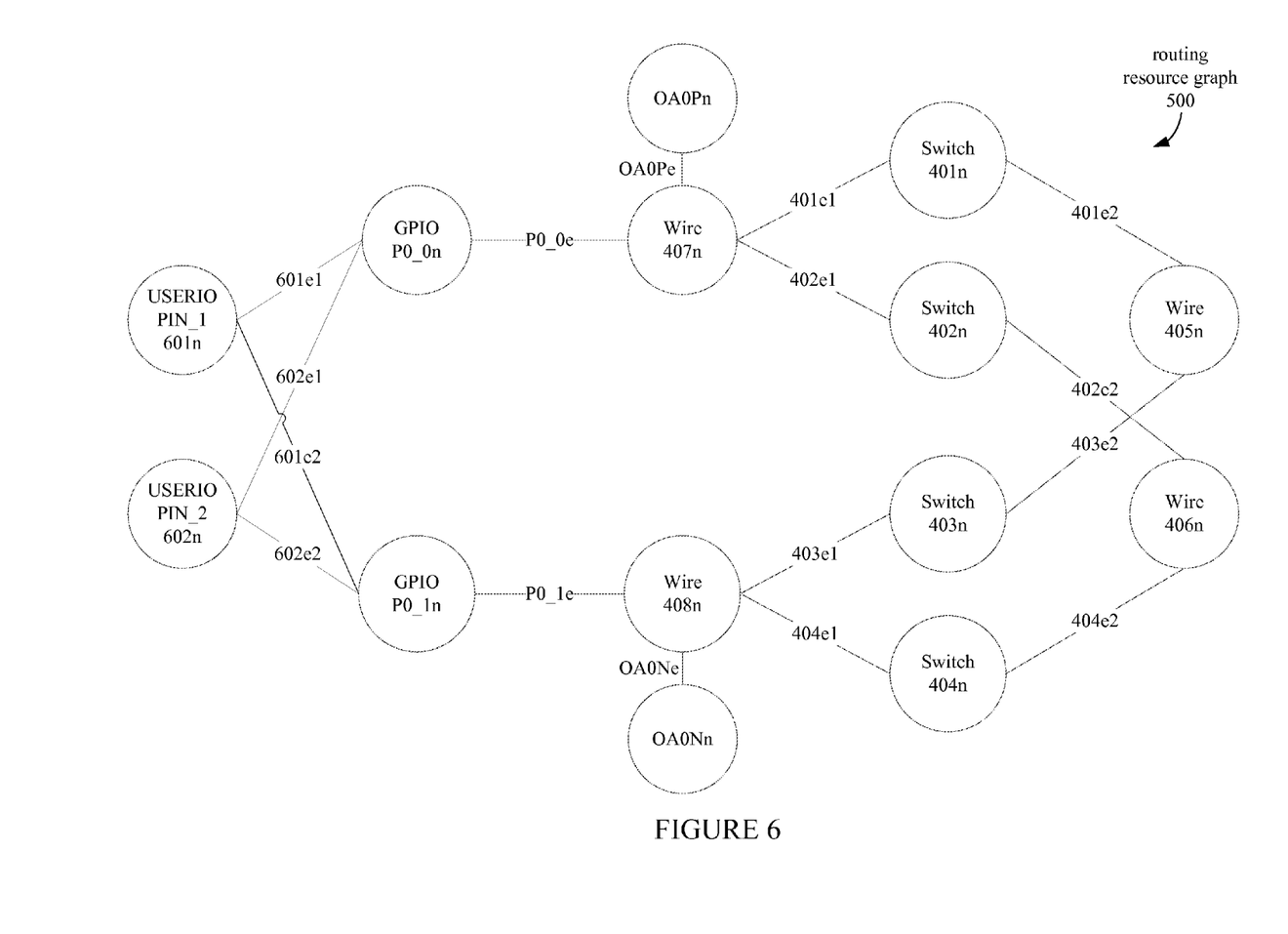
FIG. 6 illustrates an embodiment of a routing resource graph.

FIG. 6 illustrates a modified RRG 500, according to one embodiment. As illustrated in FIG. 6, nodes 601$n$ and 602$n$ are added, representing the I/O signals that the user wishes to assign to external GPIO pins. Node 601$n$ is connected to each of the GPIO nodes P0_0n and P0_1n by edges 601$e$1 and 601$e$2, respectively. Node 602$n$ is connected to each of the GPIO nodes P0_0n and P0_1n by edges 602$e$1 and 602$e$2. In one embodiment, edges may be added to connect each node representing a user I/O signal with every GPIO node in the RRG.

In one embodiment, the IDE or the user may further modify the RRG by pruning the RRG to remove invalid nodes and edges, as provided at block 315. In one embodiment, the nodes and edges that are removed may represent routing resources for invalid paths that are unlikely or unavailable to be used by the routing process. In one embodiment, invalid paths may result from user-specified placement or constraints, hardware constraints other than those that can be modeled using the RRG, or other factors.

The routing process may then use the modified RRG to route the design. In one embodiment, during the routing process, the added nodes corresponding to the user I/O signals may be designated as routing targets. In one embodiment, mechanisms in the routing process that prevent two nets from using the same wire or other routing resource causes each user I/O signal to be assigned to a unique GPIO pin. Thus, once the routing process converges on a final set of routes, the router can determine which GPIO node was traversed to reach each user I/O signal node to determine the pin assignments for the user I/O signals. The GPIO node that was traversed to reach the user I/O signal is thus assigned to that user I/O signal.

With reference back to FIG. 3, the process 207 continues from block 310 to block 320. At block 320, the router uses the RRG to determine the lowest cost paths between the physical components of the target device to make the connections as specified by the design. For example, for a design that specifies a connection between a physical pin (represented by a GPIO node) and an input or output of a physical block (such as node OA0Pn or OA0Nn), the routing process may use the RRG to calculate the lowest cost route between the physical pin and the input or output of the physical block.

In one embodiment, the router utilizes a Pathfinder iterative routing algorithm which attempts to resolve competition for routing resources by manipulating resource costs. In one embodiment, the Pathfinder routing process routes each net independently, using a wavefront propagation process to determine the lowest cost route between a source of the net to all of its targets. In an alternative embodiment, another method may be used to determine the lowest cost route, such as Dijkstra's shortest path method. Each net is a logical representation of connectivity which the user wishes to achieve via the routing resources on the target device. For each net, nodes in the RRG are traversed, starting from the initial source node. The resulting route is a series of wires, switches, or other routing resources that collectively implement the net.

In one embodiment, the source node is added to a wavefront data structure, which may be implemented as a min-heap (with respect to path cost) of nodes which have been traversed in a graph expansion of the RRG. Thus, the wavefront expansion begins at the source node, and the wavefront is repeatedly expanded by sequentially adding new nodes that are connected to the nodes already included in the wavefront. In one embodiment, nodes may be removed from the wavefront after they have been traversed. This wavefront expansion corresponds to block 321 of routing process 207. In one embodiment, as the nodes are added to the wavefront, they are added to a visited queue. In one embodiment, the visited queue is a list indicating nodes to generally avoid revisiting.

In one embodiment, the wavefront expansion may be a breadth-first graph expansion that adds nodes along multiple paths each originating from the source node, which may be a user I/O signal, for example. From each terminal node at the end of a path, the wavefront expansion may add multiple nodes connected to the terminal node; thus, additional paths may be created, and the multiple paths may be expanded concurrently. In one embodiment, the graph expansion proceeds from a first node by identifying the lowest cost edge from the first node to a second node adjacent to the first node, and adding the adjacent second node to the wavefront. If two or more edges have the same lowest cost, the graph expansion may add both of the adjacent nodes connected to those edges and proceed with a breadth-first expansion with respect to those nodes.

In one embodiment, as each new node is processed and added to the wavefront, a link is kept to the node immediately preceding it in the expansion. At block 323, the router determines whether the path has reached a target node. In response to reaching a target node as specified by the design, a "backtrace" may be performed according to block 325 to determine the routed path by following these "previous" links back to the source node. For example, the user design may indicate that PIN 1 601$n$ (which represents a user I/O signal) is to be connected to the positive input OA0P of the OA0 block, which is represented by the node OA0Pn. The wavefront expansion begins at source node 601$n$ and nodes are added to the wavefront until the target node OA0Pn is reached. In response to reaching node OA0Pn, a backtrace is performed; "previous" links are followed from OA0Pn back to PIN 1 601$n$, along the route by which OA0Pn was reached.

This process is repeated for each target that is found. Once routes have been found to all targets on one net, the source, wavefront, and targets are cleared and the next net is processed. No consideration is given at this point to overuse of routing resources (i.e. two distinct nets attempting to share the same wire); each net is routed in isolation.

In one embodiment, the resultant routes are analyzed for overuse at the conclusion of each iteration. Any routing resource which is used in more than one net undergoes an increase in cost proportional to the level of overuse (i.e. the number of nets which wish to use it) and the number of iterations during which it has been overused. All nets are then re-routed by the same process as before, but taking into account the updated resource costs. This process repeats until no resource conflicts remain, or until a fixed iteration limit is reached. In one embodiment, routing is considered to have failed due to an inability to resolve resource conflicts if the fixed iteration limit is reached. In one embodiment, successful routing results in a routing plan, which includes at least one path between physical components of the target device, such as an integrated circuit chip, based on the design.

Figure 7A:
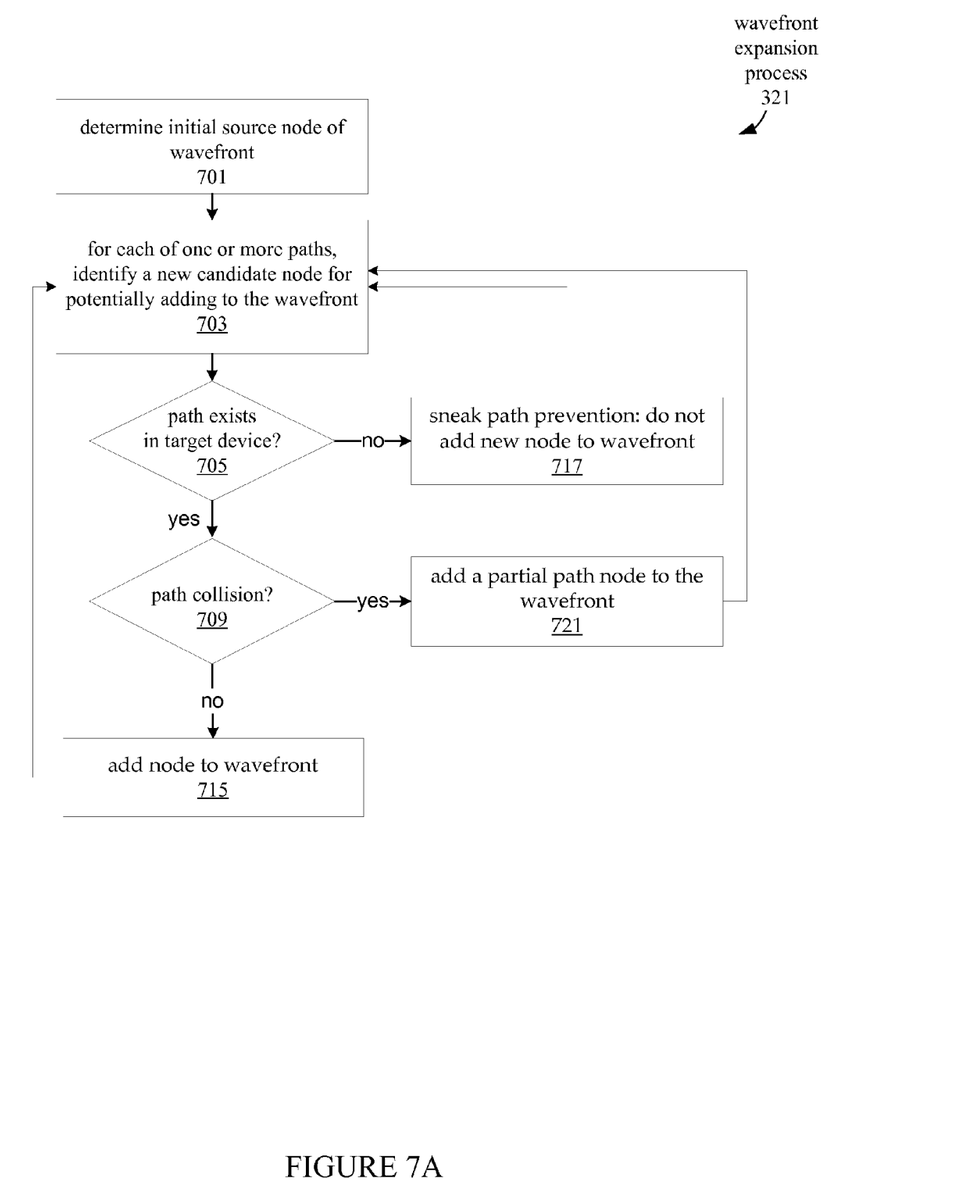
FIG. 7A is a flow diagram illustrating a wavefront expansion process, according to one embodiment.

FIG. 7A illustrates one embodiment of a wavefront expansion process 321 that may be used to route a design for a target device. In one embodiment, wavefront expansion process 321 may correspond to block 321, as illustrated in FIG. 3, and may be performed by a router portion of the IDE.

The wavefront expansion process 321 begins at block 701. At block 701, the router determines an initial source node for the wavefront. For example, the source node may be one of the added I/O signal nodes that is to be connected to a functional block input or output. The design may specify, for instance, that PIN 1 601$n$ is to be connected to OA0Pn; thus, node 601$n$ is the source node where the wavefront expansion begins. From block 701, the process 321 continues at block 703.

At block 703, for each of one or more paths along which the wavefront is being expanded, the router identifies a new node to potentially add to the wavefront. For example, beginning from the source node 601$n$, the router may identify nodes P0_0n and P0_1n as nodes to potentially add to the wavefront. Once these candidate nodes have been identified, the expansion process 321 may continue at block 705.

In one embodiment, the routing process 321 may include special mechanisms to handle situations that may arise as a result of adding the I/O signal nodes to the RRG. One such mechanism may be directed towards the prevention of "sneak" paths, which are paths that exist in the RRG and may be traversed by the router but do not physically exist in the target device. For example, a basic routing process without a mechanism for preventing sneak paths could connect PIN_1 601$n$ to PIN_2 602$n$ via edge 601$e2$, node P0_1n, and edge 602$e2$. This path does not physically exist in the target device, since the nodes PIN_1 601$n$ to PIN_2 602$n$ are virtual nodes corresponding to I/O signals rather than to physical components.

In general, a sneak path may exist when a terminal node and a new candidate node do not represent components that are physically couplable in the target device but are linked by an edge in the RRG. In these situations, a sneak path prevention mechanism may cause the router to avoid adding the new node to the wavefront.

At block 705, the router determines whether adding the candidate nodes identified at block 703 to the wavefront would result in a sneak path. In one embodiment, this may be accomplished by preventing the addition to the wavefront of any virtual nodes, such as a user I/O node, when the previous link also points to a virtual node. In the previous example, once the node P0_1n has been added, it will have a previous link back to PIN_1 601$n$, which is a virtual node. Thus, the router will not add node PIN_2 602$n$, which is also a virtual node.

It is further contemplated that there are many other methods for determining whether the addition of a new candidate node may result in a sneak path; in general, these sneak path prevention mechanisms detect paths that are unavailable in the target device. As provided at block 717, in response to detecting that the path is not available in the target device, the router refrains from adding the candidate node to the wavefront. From block 717, the process 321 continues back to block 703 so a new candidate node can be identified.

Another problematic situation may arise when routing between two virtual nodes, such as user I/O signal nodes, when neither of the nodes has yet been assigned to a specific location. For example, for a route having a source node 601$n$ and a target node 602$n$, a wavefront may expand breadth-first along 4 different paths: from 601$n$ to 401$n$, from 601$n$ to 402$n$, from 601$n$ to 403$n$, and from 601$n$ to 404$n$. Thus, the expansion eventually reaches a point where all nodes representing the four switches (401$n$, 402$n$, 403$n$, and 404$n$) have been added to the wavefront through multiple paths, and therefore are included in the visited queue. Thus, after the expansion includes nodes 405$n$ and 406$n$, the router will be unable to continue adding nodes in the absence of a mechanism that allows the visited nodes to be revisited.

At block 709, the router determines whether all possible candidate nodes are already included in the wavefront in order to determine if a path collision has occurred. For example, the router may check the visited queue to determine whether the candidate nodes have already been visited by the wavefront expansion. In one embodiment, the path collision problem may be addressed by using partial path nodes. In one embodiment, the router at block 709 may implement a lookahead mechanism to create the partial path nodes, with each of two colliding paths continuing to traverse nodes as if the nodes had not already been visited by the other path.

In one embodiment, the router implementing the lookahead mechanism checks for the following conditions to determine if a path collision has occurred that would warrant the addition of a partial path node: 1) the wavefront is currently expanding from a wire which is not attached to a GPIO node, 2) the expansion has encountered a switch which would normally be added to the wavefront, if the switch were not in the visited list, 3) that switch is not in the path leading up to the current wire (this is necessary to prevent the routing from looping back on itself), 4) the other side of the switch is connected to a wire which is attached to a GPIO node, 5) the GPIO node is not in the path leading to the current wire, and 6) the GPIO node is attached to a virtual user I/O node that is among the list of target nodes. If, at block 709, these conditions are met, the process 321 may continue at block 721.

At block 721, the router may add a partial path node to the wavefront. In one embodiment, the router may add the partial path node to the wavefront in response to determining that the partial path node represents a lowest cost path to the target node. In one embodiment, the partial path node includes information specifying the path taken from the initial wire (the current wire from which the wavefront is expanding) to the user I/O node. The partial path node may also include the cost for this partial path. In one embodiment, the cost associated with the partial path node represents the cost of reaching the final target via the partial path embodied by the partial path node, which allows the router to choose the cheapest partial path, rather than the first one found. In one embodiment, once the partial path node has been added to the wavefront, the process 321 for the path terminates and the router continues the process 321 for the next path.

In one embodiment, if a partial path node is found to be the lowest cost node in the wavefront, the router may complete the path to the target node using the information in the partial path node. In an alternative embodiment, the lookahead mechanism may be simplified by allowing the router to complete the route after finding a target node, rather than calculating the cost of the partial route and adding the partial path node to the wavefront.

In one embodiment, path collisions may be avoided by expanding a separate wavefront, with a separate set of associated data structures (visited queues, costs, etc.) for each possible mapping of a user I/O node to a GPIO node. Thus, for each I/O node, a wavefront may be expanded for each GPIO node to which the I/O signal may be assigned. The wavefronts may be expanded in parallel, with the lowest cost path resulting from these expansions being selected.

Figure 7B:
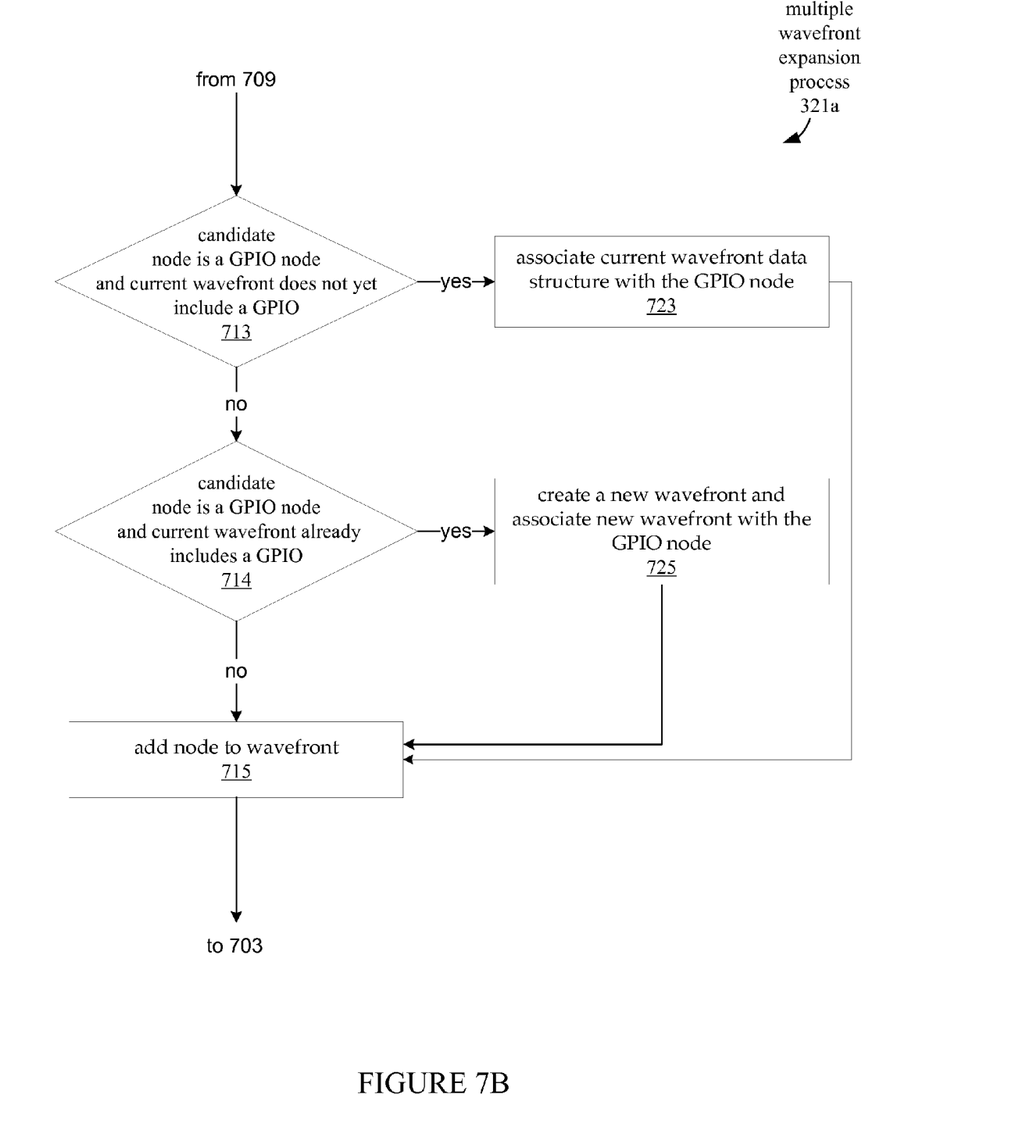
FIG. 7B is a flow diagram illustrating a wavefront expansion process, according to one embodiment.

FIG. 7B illustrates operations within a multiple wavefront expansion process 321a, according to one embodiment. Process 321a proceeds in similar fashion as process 321 until the completion of block 709. From block 709, the process 321a continues at block 713.

At block 713, the router determines whether the candidate node is a GPIO node and the current wavefront does not yet include a GPIO node. If so, the process 321a continues at block 723. At block 723, the router associates the wavefront data structure with the candidate GPIO node and at block 715 adds the node to the wavefront.

If, at block 713, the router determines that the candidate node is not a GPIO node or the current wavefront already includes a GPIO node, the process 321a continues at block 714. At block 714, the router determines whether the candidate node is a GPIO node and the current wavefront already includes a GPIO node. If so, the process 321a continues at block 725. At block 725, the router creates a new wavefront associated with the new candidate GPIO node and adds the GPIO node to the new wavefront at block 715.

Thus, each path, when passing through a GPIO node, is associated with the GPIO node such that each path is associated with no more than one GPIO node and no more than one user I/O node. Each path is expanded in parallel with other paths, and each path maintains a separate wavefront and associated data structures. In one embodiment, the router may maintain two separate wavefront data structures; alternatively, the router may maintain a single wavefront data structure with additional annotations on each node within the wavefront. Essentially, this allows the single wavefront to function as multiple "virtual" wavefronts.

When the two competing paths have both reached the target node, the lowest cost path is selected by the router. In one embodiment, ties which occur when both paths have the same cost are resolved arbitrarily; for example, the router may simply select the first path to complete, or may select one of the paths at random.

Another situation that may arise when performing a routing process on the above-described RRG is the possibility that the routing process may generate a route that connects an I/O signal node to more than one GPIO node. This would result in a signal being unnecessarily connected to two or more physical pins. Thus, one embodiment of a routing process may include a mechanism for precluding the connection of an I/O signal node to more than one GPIO node, representing a physical pin of the target device.

For example, a design may specify that PIN__1 601n is to be connected to two targets OA0Pn and OA0Nn; thus, without a mechanism for precluding the connection of an I/O signal node to more than one GPIO node, the router may connect node 601n to both of the GPIO nodes P0__0n and P0__1n. This results in two physical pins in the target device that will carry the same signal.

Figure 8:
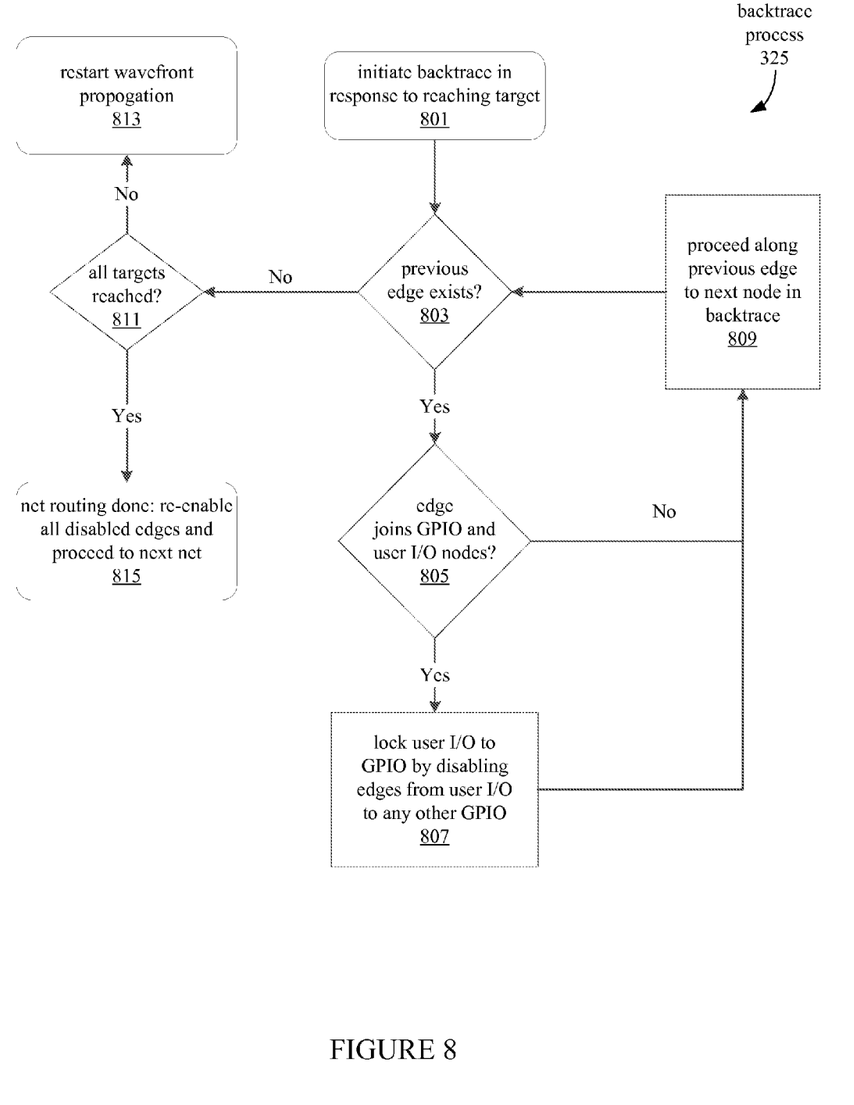
FIG. 8 is a flow diagram illustrating a backtrace process, according to one embodiment.

In one embodiment, this issue may be addressed during the backtrace process 325. FIG. 8 illustrates one embodiment of such a backtrace process 325. In one embodiment, when a backtrace is performed starting from a user I/O node, the router notes which GPIO node was traversed in order to reach the user I/O node. In response to identifying the GPIO node, the router may disable the edges from that user I/O node to all other GPIO nodes, thereby locking the user I/O node to that GPIO node until all other targets on the same net have been reached. In one embodiment, once routing concludes for the current net, the disabled edges may be re-enabled, so as to allow full flexibility in future iterations.

For example, with reference to FIG. 6, the router may be directed to determine a route between a source node PIN__1 601n and two targets OA0Pn and OA0Nn. Assuming that during an initial wavefront expansion, node OA0Pn is reached through node GPIO P0__0n before OA0Nn is reached, then a backtrace that is triggered in response to reaching the target OA0Pn passes through the edge 601e1, which joins an I/O signal node (PIN_a 601n) and a GPIO node (P0__0n). The router may recognize this situation as a special case and disable all other edges which connect to PIN__1 601n. This ensures that, as routing continues to reach other targets (such as node OA0Nn), PIN__1 601n will never be reached via any other GPIO (such as GPIO P0__1n).

In detail, the process for calculating the routes for a net connecting source node PIN__1 601n and two targets OA0Pn and OA0Nn may begin with the initialization of the wavefront with node PIN__1 601n, as provided at block 701 in FIG. 7A. As the graph expansion proceeds, PIN_1 601n may be removed from the wavefront, and the unvisited adjacent nodes of PIN__1 601n, which are GPIO P0__0n and GPIO P0__1n, are added to the wavefront, as provided at block 715. Node GPIO P0__0n is removed from the wavefront and the adjacent nodes of GPIO P0__0n are identified as candidate nodes, as provided at block 703. Unvisited node 407n, which is adjacent to GPIO P0__0n, is added to the wavefront, as provided at block 715. Unvisited adjacent node PIN__2 602n is a candidate node that is excluded from the wavefront by the sneak path prevention mechanism as provided at block 717. GPIO node P0__1n is removed from the wavefront, and the router proceeds to add wire node 408n in similar fashion as wire node 407n. At this point, the wavefront includes nodes 407n and 408n.

From node 407n, the router removes node 407n and identifies OA0Pn as one of the candidate nodes, and further recognizes OA0Pn as a target node. In response to recognizing OA0Pn as a target node, the router initiates a backtrace of the path used to reach OA0Pn, as provided at block 801 of the backtrace process 325, as illustrated in FIG. 8. From block 801, the process 325 continues block 803.

At block 803, the router determines whether a "previous" edge exists. If so, the process 325 continues at block 805. Otherwise, the process 325 continues at block 811. At block

805, the router determines whether the "previous" edge joins a GPIO node and a user I/O node. If so, then the process 325 continues at block 807, where the router locks the user I/O node to the GPIO node by disabling edges from that user I/O node to any other GPIO node. For example, when the backtrace passes through GPIO node P0__0n and reaches PIN__1 601*n*, edge 601*e*2 is disabled. GPIO node P0__0n and user I/O node PIN__1 601*n* are thus locked to each other since the edge 601*e*2 is disabled, preventing PIN__1 601*n* from being connected to GPIO P0__1n.

From block 807, or from block 805 when the "previous" edge does not join GPIO and user I/O nodes, the process 325 continues at block 809. At block 809, the router continues the backtrace by proceeding along the "previous" edge to the next node in the path. Blocks 803, 805, 807, and 809 may thus be repeated until at block 803, no "previous" edge exists. When this happens, the process 325 continues from block 803 to block 811.

At block 811, the router determines whether all targets have been reached by the wavefront propagation. If not, then the process 325 continues at block 813, and the router restarts the wavefront propagation to find the next target for the same net. In one embodiment, restarting the wavefront propagation may include deleting all nodes still in the wavefront data structure, clearing the visited list, and reinitializing the wavefront with nodes along paths to previously found targets. In the above example, the wavefront would be reinitialized with nodes PIN__1 601*n*, GPIO P0__0n, wire 407*n*, and OA0Pn.

The wavefront propagation reaches the second target, OA0Nn by the following path, assuming that wire 405*n* is chosen over wire 406*n*: PIN__1 601*n*, GPIO P0__0n, wire 407*n*, switch 401*n*, wire 405*n*, switch 403*n*, wire 408*n*, and OA0Nn. When the backtrace process 325 again reaches block 811, the router determines that all targets have been reached and continues to block 815. At block 815, the router re-enables the edges that had been disabled at block 807 to permit full flexibility when routing other nets. For example, continuing the above example, edge 601*e*2 is re-enabled. It should be noted the specific example of wavefront expansion as applied to the RRG 500 is not intended to be restrictive, and that the general method of GPIO locking as embodied in the backtrace process 325 may be used on other topologies.

In one embodiment, a similar mechanism may be used to handle forced placement of the I/O signal. For example, a user may forcibly assign PIN__1 601 to GPIO P0__0; thus, the router only adds an edge 601*e*1 from PIN__1 601*n* to P0__0n and does not create any other edges leading from node 601*n*. This forcibly assigns PIN__1 601 to GPIO P0__0 by ensuring that any route to or from PIN__1 601*n* passes through GPIO P0__0n.

With reference to FIG. 3, the completion of block 320 may result in a routing plan that includes information describing the routes that were determined for achieving the connectivity specified in the design. From block 320, the process 207 continues at block 331.

At block 331, the router may determine the assignments of the user defined I/O signals to the physical GPIO pins of the target device by extracting them from the routing plan. For instance, a route determined at block 320 that connects a particular I/O signal node to a particular GPIO node may be interpreted as an assignment of the corresponding I/O signal to the corresponding physical GPIO pin. At, block 333, the IDE may assign the physical GPIO pins to the corresponding I/O signals according to the assignments extracted from the routing plan; for example, the IDE may invoke a mapping tool that assigns the GPIO pins to the I/O signals based on the routing plan assignments. Alternatively, the mapping tool may be invoked by some means other than an IDE.

Although the Pathfinder routing method is described in the previous embodiments, alternative embodiments may use different routing methods that may use different approaches to multi-net routing. For example, the above embodiments may be adapted for use with a digital timing-driven router, as an alternative form of timing-driven I/O placement.

In an alternative embodiment, the Pathfinder-based approach could be replaced by a simple greedy routing engine. In this embodiment, the router solves for each net sequentially. Once a resource is used for one net, it is disallowed for any other net. The result after all nets have been processed is the final solution. No overuse is allowed and no iterative improvements are performed.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). A non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
receiving a design for implementing in a target device, wherein the design includes an input/output (I/O) signal of a functional block, and wherein the functional block is assigned to a physical component of the target device;
based on the design and on a routing resource graph representing the target device, creating a routing plan by calculating a route that passes through at least one node representing a physical pin that is accessible at an external surface of the target device and that has at least one end at a virtual node that is connected to the at least one node representing the physical pin; and
using a computer, assigning in the routing plan the physical pin of the target device that is represented by the at least one node to the I/O signal.

2. The method of claim 1, further comprising receiving the routing resource graph of the target device, wherein the routing resource graph represents a plurality of physical components of the target device as a plurality of nodes each connected to one or more other nodes by one of a plurality of edges, and wherein the route is a lowest cost route calculated based on a cost associated with at least one of the plurality of edges.

3. The method of claim 2, further comprising:
adding the virtual node to the routing resource graph; and
adding an edge between the virtual node and each of a plurality of nodes representing physical pins accessible at the external surface of the target device.

4. The method of claim 2, further comprising, for a path between the virtual node and a target node specified by the design, avoiding the addition to a wavefront data structure of a new node adjacent to a terminal node of the path when the physical components represented by the terminal node and the new node are not physically couplable in the target device.

5. The method of claim 1, wherein the routing resource graph comprises a plurality of nodes, and wherein calculating the route further comprises:
expanding a wavefront data structure by sequentially adding to the wavefront data structure one or more of the plurality of nodes along one or more paths each including the virtual node; and
in response to a first path of the one or more paths reaching a target node specified by the design, traversing the nodes in the first path from the target node to the virtual node.

6. The method of claim 5, further comprising:
for a second path of the one or more paths, identifying a new node to be added to the wavefront data structure based on a cost associated with an edge between the new node and a terminal node of the second path;
adding a partial path node to the wavefront data structure when the new node is already included in the wavefront data structure; and
calculating the route based on the partial path node in response to determining that the partial path node represents a lowest cost path to the target node from a terminal node of the first path.

7. The method of claim 5, further comprising expanding a plurality of wavefront data structures, wherein each of the wavefront data structures is associated with a node representing one of a plurality of physical pins of the target device, and wherein the wavefront data structure is one of the plurality of wavefront data structures.

8. The method of claim 1, further comprising precluding connection of the I/O signal to more than one physical pin.

9. The method of claim 1, further comprising pruning the routing resource graph to remove nodes and edges associated with one or more invalid paths prior to calculating the route between the physical block and the physical pin.

10. The method of claim 1, further comprising programming the target device to connect the physical component and the physical pin according to the calculated route, wherein the target device is an integrated circuit chip.

11. A method, comprising:
receiving a design for implementing in an integrated circuit chip, wherein the design describes a functional block and an input/output (I/O) signal of the functional block;
based on the description of the I/O signal, modifying a routing resource graph of the integrated circuit chip so that the modified routing resource graph includes a plurality of nodes representing physical components of the integrated circuit chip, a plurality of edges connecting each of the plurality of nodes, and one or more virtual nodes connected to at least one of the plurality of nodes that represents a physical pin that is accessible at an external surface of the target device;
generating a routing plan by calculating based on the routing resource graph a route that has one end at the virtual node and that includes the at least one node representing the physical pin; and
using a computer, including in the routing plan an assignment of the I/O signal to the one or more selected physical pins that is represented by the at least one node.

12. The method of claim 11, wherein modifying the routing resource graph further comprises:
adding the virtual node to the routing resource graph; and
adding an edge between the virtual node and each of a plurality of nodes representing one or more physical pins.

13. The method of claim 11, wherein generating the routing plan comprises determining at least one path between the physical components of the integrated circuit chip based on the design.

14. The method of claim 11, further comprising assigning the functional block to one or more of the physical components of the integrated circuit chip prior to generating the routing plan.

15. The method of claim 11, further comprising programming a programmable interconnect within the integrated circuit chip to couple the physical components of the integrated circuit chip according to the routing plan.

16. A non-transitory computer readable storage medium storing instructions that when executed by a computer cause the computer to:
receive a design for implementing in a target device, wherein the design includes an input/output (I/O) signal of a functional block, and wherein the functional block is assigned to a physical component of the target device;
based on the design and on a routing resource graph representing the target device, create a routing plan by calculating a route that passes through at least one node representing a physical pin that is accessible at an external surface of the target device and that has at least one end at a virtual node that is connected to the at least one node representing the physical pin; and
in the routing plan, assign the physical pin of the target device that is represented by the at least one node to the I/O signal.

17. The non-transitory computer readable storage medium of claim 16, wherein the routing resource graph includes a plurality of nodes each representing a physical component of the integrated circuit chip, wherein each of the plurality of nodes is connected to one or more other nodes by one of a plurality of edges, and wherein the route is a lowest cost route calculated based on a cost associated with at least one of the plurality of edges.

18. The non-transitory computer readable storage medium of claim 16, wherein the routing resource graph comprises a plurality of nodes, and wherein calculating the route further comprises:

expanding a wavefront data structure by sequentially adding to the wavefront data structure one or more of the plurality of nodes along one or more paths each including the virtual node; and     in response to a first path of the one or more paths reaching a target node specified by the design, traversing the nodes in the first path from the target node to the virtual node.

19. The non-transitory computer readable storage medium of claim 16, further storing instructions that when executed by the computer cause the computer to prune the routing resource graph to remove nodes and edges associated with one or more invalid paths prior to calculating the route between the physical component and the physical pin.

20. The non-transitory computer readable storage medium of claim 16, further storing instructions that when executed by the computer cause the computer to program the target device to connect the physical component and the physical pin according to the calculated route, wherein the target device is a programmable integrated circuit chip.

\* \* \* \* \*